United States Patent Office 2,873,294
Patented Feb. 10, 1959

2,873,294
PROCESS FOR SYNTHESIZING GLUTAMINE

Granville Bruce Kline, Greenwood, Ind., assignor to Eli Lilly and Company, Indianapolis, Ind., a corporation of Indiana No Drawing. Application June 9, 1958
Serial No. 740,585

7 Claims. (Cl. 260—518)

This invention relates to a novel catalytic reductive method of preparing glutamines.

The process provided by this invention comprises the hydrogenation of a 1,4,5,6-tetrahydro-6-oxo-3-pyridazinecarboxylic acid in the presence of a palladium catalyst to cause the cleavage of the pyridazine ring with the resulting formation of a glutamine. The process can be represented by the following equation:

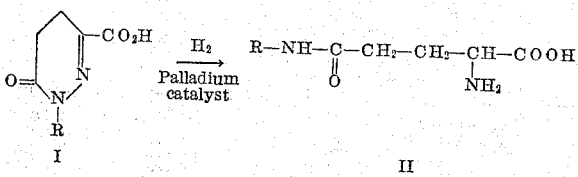

wherein R is hydrogen, a monocarbocyclic aryl-lower alkyl radical such as benzyl, xylyl, anisylmethyl, and chlorophenylmethyl; a monocarbocyclic aryl radical such as phenyl, chlorophenyl, tolyl and anisyl or an alkyl radical having from 1 to 8 carbon atoms such as ethyl or octyl.

The novel process of this invention is carried out as follows: A 1,4,5,6-tetrahydro-6-oxo-3-pyridazinecarboxylic acid is dissolved or suspended in a suitable dispersant, an amount of palladium catalyst is added, and the mixture is hydrogenated at a relatively low temperature and at a superatmospheric hydrogen pressure. After the theoretical quantity of hydrogen (2 mols per mol of pyridazinecarboxylic acid) has been absorbed or after the hydrogen uptake has substantially ceased, the mixture is removed from the hydrogenation apparatus and is filtered to remove the catalyst. The glutamine produced in the above hydrogenation is then separated from the filtrate by any suitable method, for example, by precipitation with acetones.

The palladium catalyst employed in the hydrogenation can be any of the customary palladium catalysts; i. e., either palladium alone or palladium supported on an inert carrier, as for example, 5 percent palladium-on-carbon, 5 percent palladium-on-barium sulfate, and the like. The weight of palladium metal in the catalyst used in the hydrogenation per weight of pyridazinecarboxlyic acid is not critical. Conveniently, the weight of palladium metal is about 0.5 percent of the weight of pyridazinecarboxylic acid being hydrogenated, although much higher or lower percentages are fully operative.

The dispersant employed in the hydrogenation is one which preferably is inert to the hydrogenation conditions. It can be a dispersant in which the starting pyridazinecarboxylic acid is slightly soluble, as for example, water. Alternatively, it can be a solvent in which the pyridazinecarboxylic acid is completely soluble, as for example, ethanol, methanol and ethyl acetate.

The temperature of the hydrogenation can conveniently be ambient room temperature since the reaction proceeds at a satisfactory rate under these conditions and the yield of glutamine is also satisfactory. Higher hydrogenation temperatures, i. e., up to about 40° C. can also be employed, but the advantages derived from a more rapid rate of reaction are counterbalanced by a concomitant decrease in yield caused by increased by-product formation under these more vigorous reaction conditions.

The initial hydrogen pressure employed in the reaction preferably is upwards of 50 pounds per square inch, and can be far higher. When the hydrogen pressure is in the neighborhood of 50 pounds per square inch, a conventional low pressure hydrogenation apparatus can be used in carrying out the hydrogenation. As is to be expected, the hydrogenation proceeds more slowly at a low pressure but the fact that a less expensive hydrogenation apparatus can be used tends to offset the disadvantages which are inherent in the slower reaction. A high pressure hydrogen apparatus is preferably used, however, and a hydrogen pressure in a neighborhood of 1000 pounds per square inch, as provided from a tank of hydrogen without the use of a pressure boosting device, gives a suitably rapid hydrogenation even at a hydrogenation temperature of about 25° C. Under these reaction conditions there is minimal formation of by-products.

The 1,4,5,6-tetrahydro-6-oxo-3-pyridazinecarboxylic acid as well as its derivatives which are substituted on the 1-position, are prepared by following the general procedure of R. C. Evans and F. Y. Wiselogle, described in J. Am. Chem. Soc. 67, 60 (1945).

This invention is further illustrated by the following specific examples.

EXAMPLE 1

Preparation of dl-glutamine 9 ml. of 85 percent hydrazine hydrate were added with stirring over a period of about four minutes to a solution of 22 g. of α-keto-glutaric acid in 30 ml. of water. The reaction mixture became hot and 1,4,5,6-tetrahydro-6-oxo-3-pyridazinecarboxylic acid began to precipitate as a crystalline solid. The reaction mixture was stirred at ambient room temperature for another thirty minutes and was then chilled at about 0° C. for about ten hours, to insure the nearly complete precipitation of 1,4,5,6-tetrahydro-6-oxo-3-pyridazinecarboxylic acid. The acid was separated by filtration, was washed with about 15 ml. of 2 N hydrochloric acid, and was dried. 20 g. of 1,4,5,6-tetrahydro-6-oxo-3-pyridazinecarboxylic acid hemi-hydrate were obtained which melted with decomposition at about 196–197° C.

6.7 g. of 1,4,5,6-tetrahydro-6-oxo-3-pyridazinecarboxylic acid hemi-hydrate were suspended in 50 ml. of water to which were added 2 g. of 5 percent palladium-on-carbon. This mixture was placed in a high pressure hydrogenation apparatus and was hydrogenated at ambient room temperature and a hydrogen pressure of about 1000 p. s. i. After the uptake of hydrogen had ceased, the hydrogenation mixture was removed from the apparatus and the catalyst was separated by filtration. The filtered catalyst was washed with 100 ml. of water and the washings were added to the filtrate. About 1500 ml. of acetone were added to the filtrate thus causing the dl-glutamine formed in the above hydrogenation to separate as a white crystalline solid. The dl-glutamine was separated by filtration, and was dried. A yield of 4.1 g. was obtained which represented 63 percent of the amount theoretically possible.

The above hydrogenation step was repeated except that the hydrogenation pressure was initially 50 p. s. i. and therefore a low pressure hydrogenation apparatus was used. The yield of dl-glutamine was substantially the same.

The hydrogenation of 1,4,5,6-tetrahydro-6-oxo-3-pyridazinecarboxylic acid hemi-hydrate was carried out using palladium-on-barium sulfate as a hydrogenation catalyst in place of palladium-on-carbon as specified above. The yield of dl-glutamine obtained was substantially the same.

EXAMPLE 2

*Preparation of dl-N-benzyl-α-aminoglutaramic acid*

1-benzyl-1,4,5,6-tetrahydro-6-oxo-3-pyridazinecarboxylic acid was prepared from 4.2 g. of benzylhydrazine and 5.0 g. of α-ketoglutaric acid of the procedure described in Example 1. It melted at about 175–177.5° C. after two recrystallizations from ethanol.

*Analysis.*—Calculated: C, 62.03; H, 5.21; N, 12.06. Found: C, 62.22; H, 5.09; N, 12.32.

10.9 g. of 1-benzyl-1,4,5,6-tetrahydro-6-oxo-3-pyridazinecarboxylic acid were suspended in 30 ml. of water, and the suspension was hydrogenated over a palladium-on-carbon catalyst at a temperature of 25° C. and a hydrogen pressure of 1000 pounds. The dl-N-benzyl-α-aminoglutaramic acid thus formed was isolated and was purified by the procedure described in Example 1. It melted with decomposition at about 209–210° C. Yield—46 percent of theory.

*Analysis.*—Calculated: C, 61.00; H, 6.83; N, 11.86. Found: C, 61.12; H, 7.19; N, 11.84.

p-Chlorobenzyl hydrazine, p-methoxybenzyl hydrazine and xylyl hydrazine can be substituted for benzyl hydrazine in the above example to yield respectively 1-p-chlorobenzyl-1,4,5,6-tetrahydro-6-oxo-3-pyridazinecarboxylic acid, 1-p-methoxybenzyl-1,4,5,6-tetrahydro-6-oxo-3-pyridazinecarboxylic acid and 1-xylyl-1,4,5,6-tetrahydro-6-oxo-3-pyridazinecarboxylic acid which can in turn be reduced to yield respectively dl-N-p-chlorobenzyl-α-aminoglutaramic acid, dl-N-p-methoxybenzyl-α-aminoglutaramic acid and dl-N-xylyl-α-aminoglutaramic acid.

EXAMPLE 3

*Preparation of dl-N-phenyl-α-aminoglutaramic acid*

1-phenyl-1,4,5,6-tetrahydro-6-oxo-3-pyridazinecarboxylic acid was prepared from 6.5 ml. of phenylhydrazine and 5.0 g. of α-ketoglutaric acid by the method of Example 1. The acid melted at about 170–172° C. after recrystallization from ethanol. 10.1 g. of 1-phenyl-1,4,5,6-tetrahydro-6-oxo-3-pyridazinecarboxylic acid were hydrogenated over 2 g. of palladium-on-carbon catalyst by the procedure of Example 1 to yield dl-N-phenyl-α-aminoglutaramic acid which melted at about 203–203.5° C.

*Analysis.*—Calculated: C, 59.45; H, 6.35; N, 12.60. Found: C, 59.34; H, 6.36; H, 12.63.

p-Chlorophenylhydrazine, anisylhydrazine and tolylhydrazine can be employed in place of phenylhydrazine in the above example to yield respectively 1-p-chlorophenyl-1,4,5,6-tetrahydro-6-oxo-3-pyridazinecarboxylic acid, 1-anisyl-1,4,5,6-tetrahydro-6-oxo-3-pyridazinecarboxylic acid, and 1-tolyl-1,4,5,6-tetrahydro-6-oxo-3-pyridazinecarboxylic acid which can in turn be reduced to yield dl-N-p-chlorophenyl-α-aminoglutaramic acid, dl-N-anisyl-α-aminoglutaramic acid and dl-tolyl-α-aminoglutaramic acid.

EXAMPLE 4

*Preparation of dl-N-methyl-α-aminoglutaramic acid*

1-methyl-1,4,5,6-tetrahydro-6-oxo-3-pyridazinecarboxylic acid was prepared by reacting 10 g. of α-ketoglutaric acid with a mixture composed of 18.8 g. of methylhydrazine sulfate and 14.8 ml. of 16 N sodium hydroxide. The acid melted at about 156–157° C. after recrystallization from 2 N hydrochloric acid followed by recrystallization from ethanol.

*Analysis.*—Calculated: C, 46.15; H, 5.16; N, 17.14. Found: C, 46.28; H, 5.27; N, 17.76.

6.8 g. of 1-methyl-1,4,5,6-tetrahydro-6-oxo-3-pyridazinecarboxylic acid were hydrogenated by the procedure of Example 1 in the presence of 2 g. of a 5 percent palladium-on-carbon catalyst to yield dl-N-methyl-α-aminoglutaramic acid which melted at about 196–196.5° C. after recrystallization from a water-ethanol solvent mixture. Yield 48 percent of theory.

*Analysis.*—Calculated: C, 44.99; H, 7.55; N, 17.49. Found: C, 45.18; H, 7.64; N, 17.42.

Ethylhydrazine, butylhydrazine and octylhydrazine can be employed in place of methylhydrazine in the above example to yield respectively 1-ethyl-1,4,5,6-tetrahydro-6-oxo-3-pyridazinecarboxylic acid, 1-butyl-1,4,5,6-tetrahydro-6-oxo-3-pyridazinecarboxylic acid and 1-octyl-1,4,5,6-tetrahydro-6-oxo-3-pyridazinecarboxylic acid which can in turn be reduced to yield dl-N-ethyl-α-aminoglutaramic acid, dl-N-butyl-α-aminoglutaramic acid and dl-N-octyl-α-aminoglutaramic acid.

I claim:

1. The process of preparing a glutamine represented by the following formula:

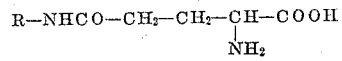

in which R represents a member of the group consisting of hydrogen, an alkyl group having from 1 to 8 carbon atoms, a monocarbocyclicaryl group and a monocarbocyclicaryl-lower alkyl group, which process comprises hydrogenating in the presence of a palladium catalyst at a superatmospheric hydrogen pressure and a temperature below about 40° C., a dispersion of a 1,4,5,6-tetrahydro-6-oxo-3-pyridazinecarboxylic acid represented by the following formula:

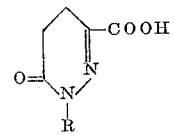

in which R has the same significance as hereinabove.

2. The process of claim 1, in which a palladium-on-carbon catalyst is employed.

3. The process of claim 1, in which the hydrogenation temperature is ambient room temperature.

4. The process wherein 1,4,5,6-tetrahydro-6-oxo-3-pyridazinecarboxylic acid hemi-hydrate is hydrogenated over a palladium catalyst to yield dl-glutamine.

5. The process wherein 1-benzyl-1,4,5,6-tetrahydro-6-oxo-3-pyridazinecarboxylic acid is hydrogenated over a palladium catalyst to yield dl-N-benzyl-α-aminoglutaramic acid.

6. The process wherein 1-phenyl-1,4,5,6-tetrahydro-6-oxo-3-pyridazinecarboxylic acid is hydrogenated over a palladium catalyst to yield dl-N-phenyl-α-aminoglutaramic acid.

7. The process wherein 1-methyl-1,4,5,6-tetrahydro-6-oxo-3-pyridazinecarboxylic acid is hydrogenated over a palladium catalyst to yield dl-N-methyl-α-aminoglutaramic acid.

References Cited in the file of this patent

Feofilaktov et al.: Chem. Ab., vol. 48 (1954), p. 4444.